United States Patent [19]

Sugiyama et al.

[11] 4,179,294

[45] Dec. 18, 1979

[54] SILVER HALIDE LIGHT-SENSITIVE ELEMENT CONTAINING DYE

[75] Inventors: Masatoshi Sugiyama; Eiichi Kato, both of Minami-ashigara, Japan

[73] Assignee: Fuji Photo Film Co., Ltd., Minami-ashigara, Japan

[21] Appl. No.: 929,602

[22] Filed: Jul. 31, 1978

Related U.S. Application Data

[63] Continuation of Ser. No. 781,802, Mar. 28, 1977, abandoned.

[30] Foreign Application Priority Data

Mar. 26, 1976 [JP] Japan .................................. 51-33165

[51] Int. Cl.$^2$ .............................................. G03C 1/84
[52] U.S. Cl. ................................. 430/522 A; 542/444
[58] Field of Search ............... 96/84 A, 84 R, 84 UV; 542/444

[56] References Cited

U.S. PATENT DOCUMENTS

| | | | |
|---|---|---|---|
| 3,778,273 | 12/1973 | Gernert et al. ...................... | 96/84 R |
| 3,795,519 | 3/1974 | Miyazako et al. ................... | 96/84 A |
| 3,932,188 | 1/1976 | Tanaka et al. ....................... | 96/84 R |

*Primary Examiner*—Jack P. Brammer

*Attorney, Agent, or Firm*—Sughrue, Rothwell, Mion, Zinn and Macpeak

[57] ABSTRACT

A silver halide photographic light-sensitive element which comprises at least one hydrophilic colloid layer containing at least one basic polymer and at least one oxonol dye of the following formula (I):

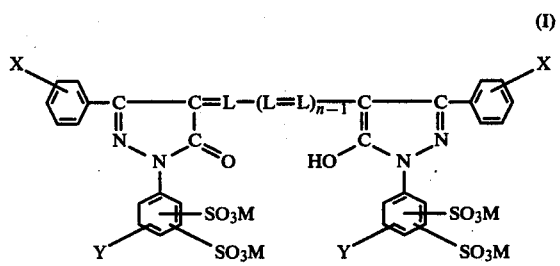

wherein X represents a hydrogen atom, a halogen atom, an alkyl group, an akloxy group, an alkylthio group, an alkoxycarbonyl group or an amino group; Y represents a hydrogen atom, a halogen atom, a sulfo group, a lower alkyl group or a hydroxy group; L represents a methine group; M represents a cation; and n represents a positive integer of from 1 to 3. In this element, the hydrophilic colloid layer can be dyed selectively and the dye can be decolorized readily and completely.

16 Claims, No Drawings

SILVER HALIDE LIGHT-SENSITIVE ELEMENT CONTAINING DYE

This is a continuation of application Ser. No. 781,802 filed Mar. 28, 1977 now abandoned.

BACKGROUND OF THE INVENTION

1. Field of the Invention

The present invention relates to a photographic light-sensitive element having a dyed hydrophilic colloid layer, and more particularly, to a silver halide photographic light-sensitive element having a hydrophilic colloid layer containing a basic polymer and a dye capable of being readily decolorized or removed during photographic processing.

2. Description of the Prior Art

In silver halide photographic light-sensitive elements, photographic emulsion layers and other layers are often colored in order to absorb light in a particular wavelength region.

Where it is required to control the spectral composition of light incident upon the photographic emulsion layer or layers, a colored layer is positioned in a position more remote from the support than the photographic emulsion layer or layers. Such a colored layer is referred to as a filter layer. In the case of photographic elements having a plurality of photographic emulsion layers, such as multilayer color light-sensitive elements, a filter layer may be positioned between two emulsion layers.

A colored layer is also positioned between the support and the photographic emulsion layer, or on the surface of the support opposite the emulsion side in order to prevent blurring of the image, i.e., halation, caused by re-entry, into the emulsion layer or layers, of light that is scattered during or after transmission through the emulsion layer or layers and reflected at the interface between an emulsion layer and the support. Such a colored layer is referred to as an antihalation layer. With photographic elements having a plurality of photographic emulsion layers, such as multilayer color light-sensitive elements, an antihalation layer may be positioned between two emulsion layers.

Also dyeing of one or more photographic emulsion layers is also used in order to prevent a reduction of sharpness of the image due to the scattering of light in the photographic emulsion layers. (This phenomenon is generally referred to as irradiation.)

Most of these colored layers are composed of a hydrophilic colloid and, accordingly, water-soluble dyes are usually incorporated thereinto for the purpose of dyeing these layers. Dyes to be used for this purpose must have appropriate spectral absorption properties and, in addition, must satisfy those requirements as set forth below:

(1) They must be photographically inert. That is, they must not have adverse chemical effects, such as cause a reduction in sensitivity, a regression of the latent image and a generation of fog. (2) They must be decolorized or removed by dissolving during photographic processing without leaving harmful stain on the photographic element after processing.

Much effort has been made by those skilled in the art in order to find dyes that satisfy the above requirements. Examples of hitherto known dyes include oxonol dyes containing pyrazolone nuclei, such as those described in U.S. Pat. No. 2,274,782 (corresponding to British Pat. No. 506,385), Japanese Patent Publications Nos. 22,069/64 and 13,168/68, and Japanese Patent Application (OPI) 85,130/73; other oxonol dyes such as those described in U.S. Pat. Nos. 3,247,127, 3,653,905 and 2,533,472, and French Pat. No. 1,401,588; and 4-benzylidene-pyrazolone dyes such as those described in U.S. Pat. No. 3,540,887 (corresponding to British Pat. No. 584,609).

Most of the dyes capable of being decolorized during photographic processing are decolored by sulfites present in a developing solution or by sulfites and the alkaline condition of the solution (as described, for example, in U.S. Pat. No. 2,274,782 (corresponding to British Pat. No. 506,385)).

Dyes to be used for the coloring of hydrophilic colloid layers in light-sensitive elements must have properties such that not only can they readily and completely be decolorized during photographic processings such as development, etc., but also the decolorized products thereof must be capable of being readily dissolved from the light-sensitive elements during processing steps, mainly washing steps after development, so that their color in the photographic element is not re-formed. For rapid photographic processings adopted recently in order to increase the efficiency of photographic processing, very few known dyes are satisfactory in regard to decolorizing speed during steps such as development, etc., and the dissolving speed of the decolorized products thereof or the undecolorized dyes themselves during washing steps.

On the other hand, where the dyed layer is a filter or antihalation layer situated on the emulsion side of the support, generally such a layer must be dyed selectively, so that no other layer is substantially dyed. Because, if a layer other than the filter or antihalation layer is colored, not only is the effect as a filter or antihalation layer reduced, but also harmful spectral effects are exerted on other layers. In order to selectively dye particular hydrophilic colloid layers, hydrophilic polymers containing groups having a charge opposite that of the ion of the dye are often incorporated as a mordant into hydrophilic colloid layers to be dyed, the dye being located in these particular layers in interaction between the dye molecule and the mordant.

For example, polymers derived from ethylenically unsaturated compounds having dialkylaminoalkyl ester groups such as those described in British Pat. No. 685,475; polymers obtained from the reaction of polyvinyl alkyl ketones with aminoguanidines such as those described in British Pat. No. 850,281; polymers derived from 2-methyl-1-vinylimidazoles such as those described in U.S. Pat. No. 3,445,231; and the like; are known as examples of such mordants.

However, when such a mordanting method using these polymers is employed and a layer containing dyes therein is contacted with other hydrophilic layers, a portion of the dyes often diffuses from the former layer to the latter layers. Such a diffusion of dyes depends on the chemical structure of dyes used, as well as the chemical structure of the mordants used.

When such polymeric mordants are used, dyes particularly tend to remain in the light-sensitive element after photographic processing, particularly after photographic processing carried out in a shortened period of time. It is thought that this is because such a mordant still possesses a weak bonding strength to the dye in an alkaline solution such as a developing solution, although it is considerably reduced in an alkaline solution. Such a difficulty depends greatly on the chemical structure of dyes used, as well as the chemical structure of mordants used.

Of the various known water-soluble dyes used for the dyeing of hydrophilic colloid layers in photographic light-sensitive elements, oxonol dyes having pyrazolone nuclei, which can be represented by those described in U.S. Pat. No. 2,274,782 (corresponding to British Pat. No. 506,385), have been used as useful dyes since they are capable of being readily decolorized in developing solutions containing sulfites and have only slight adverse effects on the photographic properties of photographic emulsions. Most of these dyes, however, are incapable of being mordanted sufficiently by basic polymers, so that they tend to diffuse from the basic polymer-containing layers to other layers.

On the other hand, where a colored layer is to serve as a filter layer, the absorption density of such a layer needs to be above 0.8 and, moreover, often this density must be obtained with a layer having a thickness of about 2 μm or less. As a typical example of such a layer, mention may be made of yellow layers which are positioned under the blue-sensitive emulsion layer in multilayer color light-sensitive elements. In such a case, a dye that is capable of being dissolved in hydrophilic colloid layers in high concentrations must be used.

SUMMARY OF THE INVENTION

An object of this invention is to provide a silver halide photographic light-sensitive element having a hydrophilic colloid layer colored with a water-soluble dye which is capable of being decolorized during photographic processing and which has no adverse effects upon the photographic properties of photographic emulsions.

Another object of this invention is to provide a silver halide photographic light-sensitive element having a basic polymer-containing hydrophilic colloid layer that is completely selectively dyed.

A further object of this invention is to provide a silver halide photographic light-sensitive element having a hydrophilic colloid layer containing a dye that leaves no stain after photographic processing even when a basic polymer is present in at least one hydrophilic colloid layer of the element.

These objects of the present invention are achieved with a silver halide photographic light-sensitive element containing a basic polymer in at least one hydrophilic colloid layer and, in addition, containing an oxonol dye containing two pyrazolone nuclei substituted at the 3-positions by phenol groups (which may be substituted) in at least one hydrophilic colloid layer thereof.

DETAILED DESCRIPTION OF THE INVENTION

The dyes used in the present invention can be represented by the following formula (I):

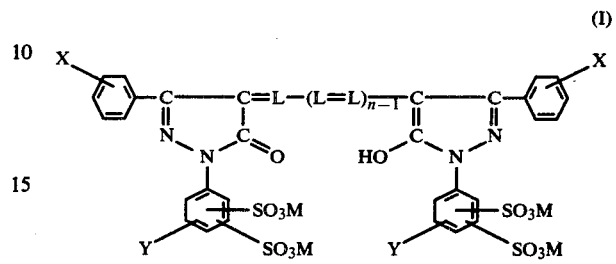

wherein X represents a hydrogen atom, a halogen atom (e.g., chlorine, bromine, etc.), an alkyl group containing 1 to 6 carbon atoms (e.g., methyl, ethyl, tert-butyl, etc.), an alkoxy group containing 1 to 6 carbon atoms (e.g., methoxy, ethoxy, etc.), an alkylthio group containing 1 to 6 carbon atoms (e.g., methylthio, etc.), an alkoxycarbonyl group containing in the alkoxy moiety from 1 to 6 carbon atoms (e.g., methoxycarbonyl, ethoxycarbonyl, butoxycarbonyl, etc.) or an amino group, the alkyl group may be substituted, for example, with one or more of a halogen atom (e.g., chlorine, etc.), a cyano group, a sulfo group or a hydroxy group, and the amino group may be substituted, for example, with an alkyl group containing 1 to 4 carbon atoms or with a carboacyl group (e.g., acetyl, propionyl, butyroyl, etc.); Y represents a hydrogen atom, a halogen atom (e.g., chlorine, bromine, etc.), a sulfo group, an alkyl group containing 1 to 4 carbon atoms (e.g., methyl, ethyl, isopropyl, etc.) or a hydroxy group; M represents a cation, such as a hydrogen atom, an alkali metal atom (e.g., sodium, potassium, etc.), an alkaline earth metal atom (e.g., calcium, barium, etc.), an ammonium or an organic onium group (e.g., triethylammonium, pyridinium, piperadinium, morpholinium, etc.); n represents an integer of 1 to 3; and L preferably represents a methine group, in which any of the methine groups forming the methine chain represented by $=L-(L=L)_{n-1}$ may be substituted with an alkyl group containing 1 to 3 carbon atoms (e.g., methyl, ethyl, etc.), a phenyl group, a benzyl group, a phenethyl group or a halogen atom (e.g., chlorine, bromine, etc.).

The oxonol dyes used in this invention can be characterized as having phenyl groups at the 3-positions of the pyrazolone nuclei and phenyl groups containing at least two sulfo groups at the 1-positions of the pyrazolone nuclei, and are superior in mordanting properties and decolorizing and dissolving properties.

The following are examples of oxonol dyes which can be used in this invention. However, it is to be understood that the invention is not to be construed as being limited to these dyes.

1.
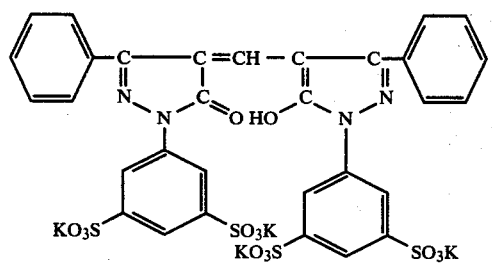
2.
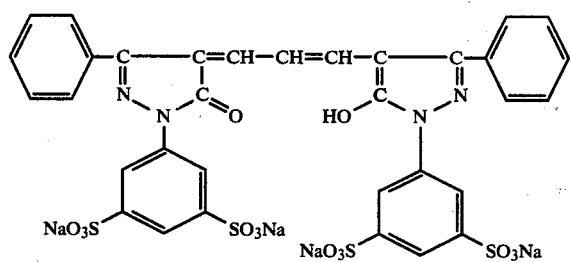
3.
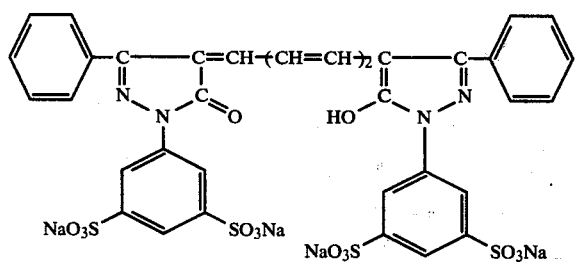
4.
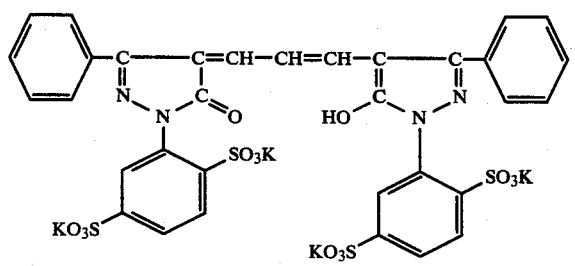
5.
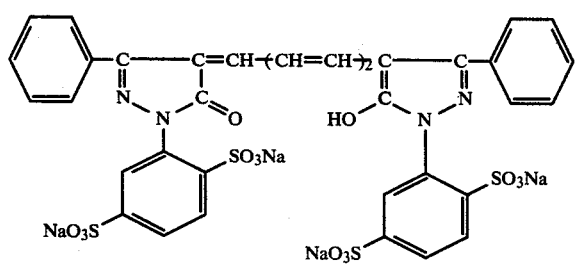
6.
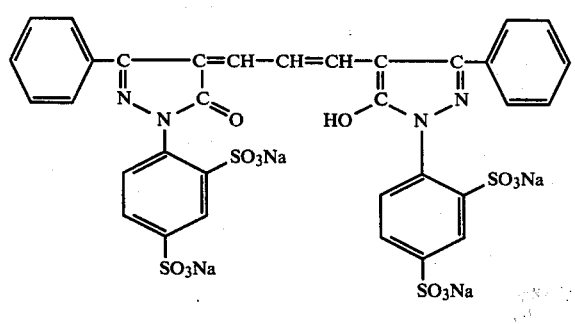

-continued
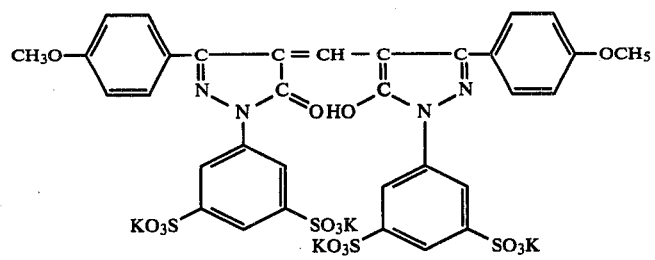
7.
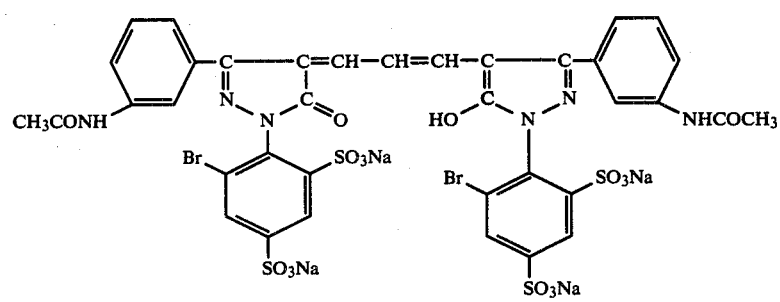
8.
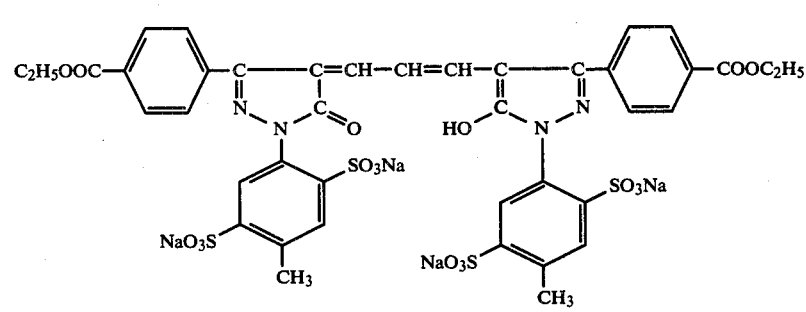
9.
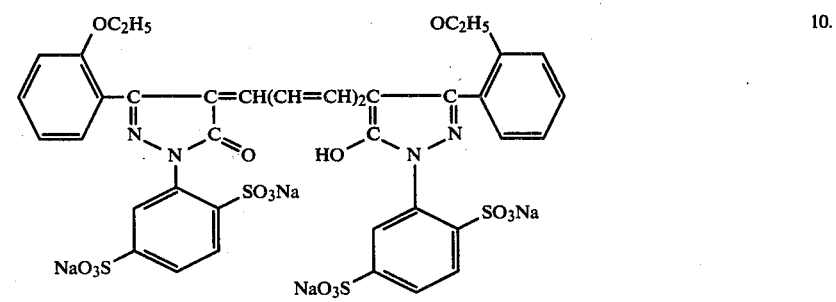
10.
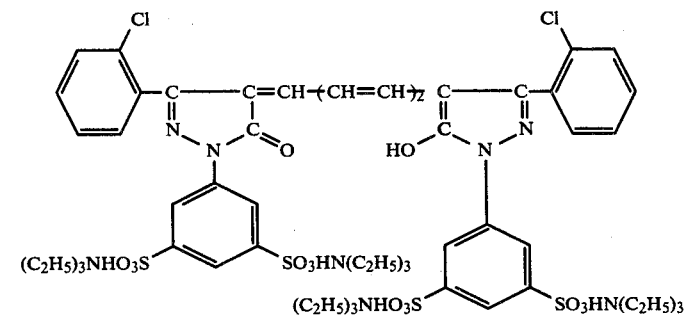
11.

-continued
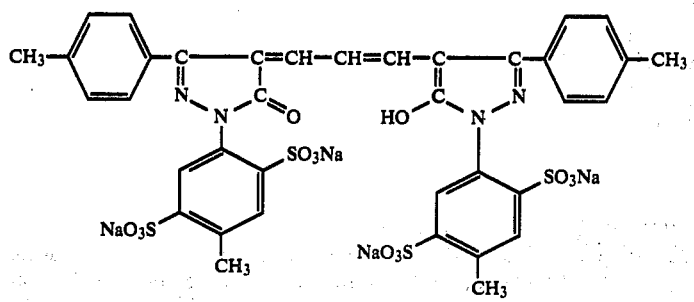
12.
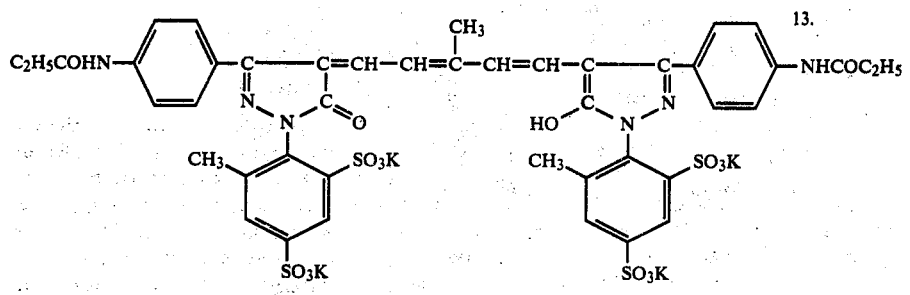
13.
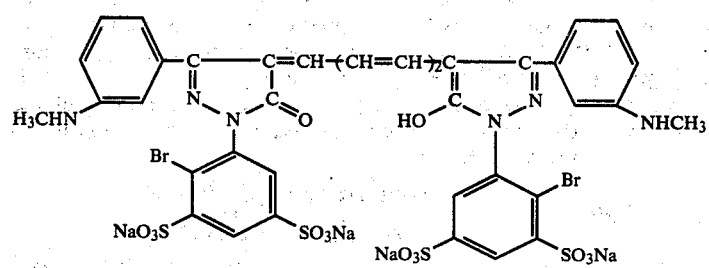
14.
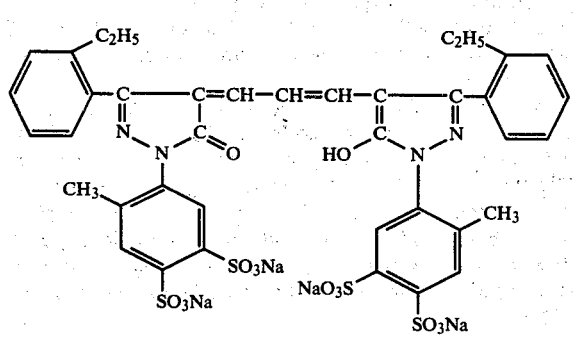
15.
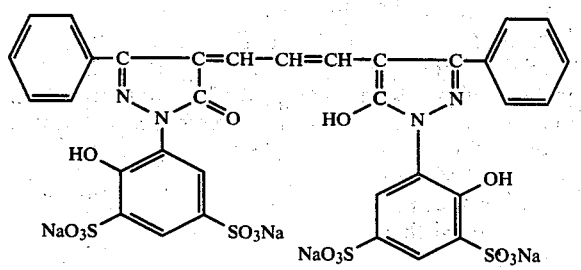
16.

17.

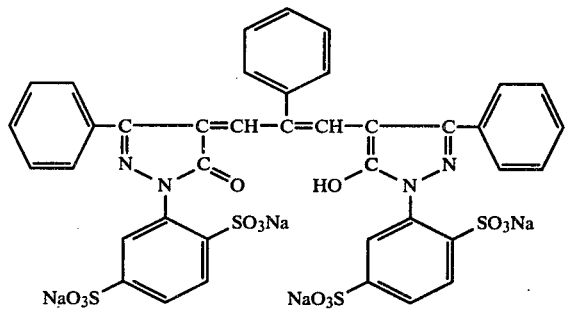

The novel oxonol dyes according to the invention can be prepared according to conventional methods described in, e.g., U.S. Pat. No. 3,746,539 and British Pat. No. 1,007,847. That is, a pyrazolone having appropriate substituents is reacted with a compound which is known in the art as an agent for introducing a methine group or a polymethine chain into a methine dye, in the presence of an organic base such as triethylamine, pyridine, piperidine, morpholine, or the like. The details of compounds of this kind are described in British Pat. No. 133,986.

Specifically, ethyl orthoformate, ethyl orthoacetate or N,N-diphenylformamidine hydrochloride can be used for the introduction of a monomethine chain; trimethoxypropane, tetramethoxypropane or malondialdehyde di-anil hydrochloride can be used for the introduction of a trimethine chain; and glutacondialdehyde di-anil hydrochloride can be used for the introduction of a pentamethine chain.

Specific examples of the synthesis of the oxonol dyes of this invention are given below. Unless otherwise indicated, all parts, percents, ratios and the like are by weight.

SYNTHESIS EXAMPLE 1

Preparation of Dye 1

A mixture of 8 g of 3-phenyl-1-(3',5'-disulfophenyl)-5-pyrazolone, 2 g of diphenylformamidine, 8.5 ml of triethylamine, 30 ml of N,N-dimethylformamide and 30 ml of methanol was heated under reflux for 1 hour.

A solution (20 ml) of 2 g of anhydrous potassium acetate in methanol was added to the mixture, and the resulting mixture was heated under reflux for 5 minuteds and then cooled to 20° C. with water. The precipitated crystals were collected by filtration, washed thoroughly with ethanol and acetone, and dried to obtain 6.3 g of yellow crystals. An aqueous solution of this dye showed a yellow color and had an absorption maximum at 460 nm.

SYNTHESIS EXAMPLE 2

Preparation of Dye 2

A mixture of 4.4 g of disodium salt of 3-phenyl-1-(3',5'-disulfophenyl)-5-pyrazolone, 1 g of malondialdehyde di-anil hydrochloride, 3 ml of triethylamine and 40 ml of methanol was heated on a water bath. To this was added 2 ml of acetic anhydride and the resulting mixture was heated under reflux for 2 hours with stirring. The reaction mixture was condensed under reduced pressure to ½ of its original volume and then cooled to 20° C. with water. Reddish brown crystals were precipitated.

The crystals were collected by filtration, washed thoroughly with ethanol and acetone, and dried to obtain 2.8 g of reddish brown crystals. An aqueous solution of this dye showed a red color and had an absorption maximum at 531 nm.

SYNTHESIS EXAMPLE 3

Preparation of Dye 3

To a mixture of 4.4 g of disodium salt of 3-phenyl-(3',5'-disulfophenyl)-5-pyrazolone, 1.4 g of glutacondialdehyde di-anil hydrochloride, 4 ml of triethylamine and 50 ml of methanol was added, with stirring, 2 ml of acetic anhydride at a temperature of 10° to 15° C., and the resulting mixture was stirred an additional 3 hours at the same temperature. The reaction mixture was condensed under reduced pressure to ½ of its original volume and 200 ml of isopropanol was added to the concentrate. Dark blue crystals were precipitated. The crystals were collected by filtration, washed thoroughly with ethanol and acetone, and dried to obtain 2.5 g of dark blue crystals. An aqueous solution of the dye showed a blue color and had an absorption maximum at 630 nm.

SYNTHESIS EXAMPLE 4

Preparation of Dye 4

A mixture of 4 g of 3-phenyl-(2',5'-disulfophenyl)-5-pyrazolone, 1 g of malondialdehyde di-anil hydrochloride, 4 ml of triethylamine, 2 ml of acetic anhydride and 40 ml of methanol was heated under reflux for 3 hours with stirring.

A solution (20 ml) of 2 g of anhydrous potassium acetate in methanol was added to the mixture, and the resulting mixture was heated under reflux for 5 minutes and cooled to 20° C. with water. The precipitated crystals were collected by filtration, washed thoroughly with ethanol and acetone, and dried to obtain 3.1 g of dark brown crystals. An aqueous solution of the dye showed a red color and had an absorption maximum at 531 nm.

SYNTHESIS EXAMPLE 5

Preparation of Dye 6

A mixture of 4.4 g of disodium salt of 3-phenyl-1-(2',4'-disulfophenyl)-5-pyrazolone, 1 g of malondialdehyde di-anil hydrochloride, 3 ml of triethylamine, 2 ml of acetic anhydride and 50 ml of methanol was heated under reflux for 4 hours with stirring. The reaction mixture was condensed, on a water bath, under reduced pressure to ½ of its original volume and then cooled with water. The precipitated crystals were collected by filtration, washed thoroughly with ethanol and acetone, and dried to obtain 2.6 g of dark brown crystals. An aqueous solution of the dye showed a red color and had an absorption maximum at 531 nm.

SYNTHESIS EXAMPLE 6

Preparation of Dye 10

A mixture of 4.8 g of disodium salt of 3-(2'-ethoxyphenyl)-1-(2',5'-disulfophenyl)-5-pyrazolone, 1.4 g of glutacondialdehyde di-anil hydrochloride, 4 ml of triethylamine, 2 ml of acetic anhydride, 25 ml of methanol and 25 ml of N,N-dimethylformamide was heated under reflux for 4 hours at 10° to 15° C., with stirring, and then 200 ml of isopropanol was added to the reaction mixture to precipitate crystals.

The crystals were collected by filtration, washed thoroughly with ethanol and acetone, and dried to obtain 2 g of dark blue crystals. An aqueous solution of the dye showed a blue color and had an absorption maximum at 631 nm.

Pyrazolones used for the preparation of the dyes used in the invention can be synthesized by reaction of β-keto-acid esters represented by the general formula (II):

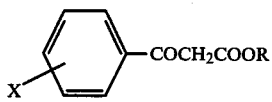

(II)

wherein X is as defined hereinabove and R represents an alkyl group (e.g., a methyl, ethyl, n-butyl, etc., group) or a phenyl group; with phenylhydrazines having at least two sulfo groups represented by the following general formula (III):

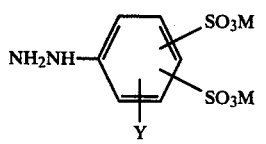

(III)

wherein Y and M are as defined hereinabove; which is effected in a strong alkaline solution at 90° C. (as described by Reeves, J. Chem. Soc., 127, 912), in a neutral solution at 100° C. (as described by H. E. Ficerz-David and L. Blangey, Glundlegende Operation der Farbenchemie, 8, Aufl. (Vienna, 1952), p. 124), in an aqueous 50% solution of acetic acid with heating (as described by Mollenhoff, Ber., 25, 1948), or in a mixed solution of acetic acid and triethylamine with heating (as described in Japanese Patent Application (OPI) No. 125,384/1976).

The β-keto-acid esters represented by the general formula (II) can be synthesized according to the method described in J. Amer. Chem. Soc., 51, 3636 (1929), and Ber., 75B, 447, 455, 460 (1942), etc.

Examples of β-keto-acid esters represented by the general formula (II) include ethyl benzoylacetate, ethyl 4-methoxybenzoylacetate, methyl 2-methoxybenzoylacetate, ethyl 2-ethoxybenzoylacetate, ethyl 3-acetamidobenzoylacetate, ethyl 2-chlorobenzoylacetate, methyl 3-methylaminobenzoyl-acetate, ethyl 4-ethoxycarbonylbenzoylacetate, ethyl 4-methylbenzoylacetate, etc.

Phenylhydrazines having at least two sulfo groups represented by the general formula (III) can be synthesized according to the methods described in Beilsteins Handbuch der Organischen Chemie, 15 (Syst. No. 2082), p. 647, and Ber., 21, 3409.

Examples of phenylhydrazines represented by the general formula (III) include disodium phenylhydrazine-2,5-disulfonate, phenylhydrazine-3,5-disulfonic acid, disodium phenylhydrazine-2,4-disulfonate, 2-bromophenylhydrazine-2,4-disulfonic acid, 2-chlorophenylhydrazine-2,4-disulfonic acid, 2-hydroxyphenylhydrazine-3,5-disulfonic acid, 4-methylphenylhydrazine-2,4-disulfonic acid, disodium 4-bromophenylhydrazine-3,5-disulfonate, disodium 3-methylphenylhydrazine-2,4-disulfonate, disodium 2-methylphenylhydrazine-4,5-disulfonate, etc.

Examples of pyrazolones which can be used in the present invention include disodium 1-(3,5-disulfonyl)-3-phenyl-5-pyrazolone, disodium 1-(2,5-disulfophenyl)-3-phenyl-5-pyrazolone, disodium 1-(2,5-disulfophenyl)-3-(2-ethoxyphenyl)-5-pyrazolone, disodium 1-(2,4-disulfophenyl)-3-(3-methylaminophenyl)-5-pyrazolone, ditriethylamine 1-(2-hydroxy-3,5-disulfophenyl)-3-(4-methylaminophenyl)-5-pyrazolone, dipotassium 1-(4-bromophenyl-3,5-disulfophenyl)-3-(2-chlorophenyl)-5-pyrazolone, etc.

SYNTHESIS EXAMPLE 7

Preparation of Disodium 1-(2,5-Disulfophenyl)-3-phenyl-5-pyrazolone 7.0 g of disodium phenylhydrazine-2,5-disulfonate was suspended in 25 ml of water and to the resulting suspension was added 5 ml of a 10% aqueous sodium carbonate solution at 65° C. with stirring carefully so that the resulting mixture was not made alkaline. As a result the mixture dissolved and formed a solution of a pH of 6.5. To the solution thus obtained was added 3.9 g of ethyl benzoylacetate and 20 ml of a 10% aqueous sodium carbonate solution which was stirred for 4 hours at 90° C. The pH of the reaction mixture was maintained alkaline. Then the reaction mixture was water cooled to 20° C. or less and the pH thereof was adjusted to 3 by adding hydrochloric acid followed by concentrating the system to dryness under reduced pressure. To the residue were added 50 ml of methanol and 10 ml of triethylamine which was then heated to dissolve and insoluble materials filtered out. To the filtrate thus obtained was added 2 g of glacial acetic acid and the mixture was concentrated under reduced pressure. 50 ml of acetonitrile was added to the mixture to precipitate crystals which were filtered and washed with ethanol followed by drying. Yield: 8.7 g.

Recrystallization of the crystals thus obtained from a 90% aqueous methanol solution afforded 6.5 g of crystals having a melting point of 300° C. or higher.

Elemental Analysis

| $C_{15}H_{10}N_2O_7S_2Na_2$ | C (%) | H (%) | N (%) |
|---|---|---|---|
| Calculated: | 40.9 | 2.29 | 6.36 |
| Found: | 40.76 | 2.33 | 6.41 |

The oxonol dyes can be incorporated into a hydrophilic colloid layer in the photographic light-sensitive elements of the invention in conventional manner. That is, an aqueous solution of the dyes with an appropriate concentration may be added to an aqueous solution of a hydrophilic colloid, and the solution may be coated using a known method onto the support or onto the surface of a layer that constitutes the element.

The selection of the amount of the dyes to be added to the aqueous solution of a hydrophilic colloid can be made suitably within the solubility of the dyes, depending upon the purposes. In general, it is practical to prepare an aqueous solution of the dyes with a concentration of from about 0.5 to about 3%, and then to apply it to the elements at a dye coverage of from about 8 to about 800 mg per $m^2$ of the surface area of the elements.

In the light-sensitive elements of the invention, the dyes can be advantageously added to a coating solution for a hydrophilic colloid layer containing a basic polymer upon the coating of the layer to the elements. However, the dyes may also be added to a coating solution for other hydrophilic colloid layers, such as photographic emulsion layers or other light-insensitive layers. In the latter case, it is preferable to incorporate the dyes into a layer that is as close as possible to the basic polymer-containing layer, desirably into a layer adjacent thereto. Even if they are incorporated into a layer which does not contain a basic polymer, the dyes diffuse into the layer in which the basic polymer is present and are concentrated therein, so that the basic polymer-containing layer is selectively dyed in the finished light-sensitive elements. The dyes may be introduced into more than one layer, if desired.

In the light-sensitive elements of the invention, there may be present either a single or a plurality of hydrophilic colloid layers containing a basic polymer, and such a layer or layers may be situated at a position on or over a photographic emulsion layer (i.e., a position more remote from the support) or, where a plurality of photographic emulsion layers are present, between two of the photographic emulsion layers, as well as at a position between a photographic emulsion layer and the support. The function of the layer selectively dyed with the aid of a basic polymer present therein can be a filter layer or an antihalation layer as well as a layer having other purposes, depending on its position in the elements.

The light-sensitive elements of the invention do contain a basic polymer in at least one hydrophilic colloid layer. Basic polymers which may be used are hydrophilic basic polymers containing basic residues in their main or side chains, soluble in water, and compatible with gelatin, which are conventionally used for the mordanting of acidic dyes used for hydrophilic colloid layers of silver halide photographic light-sensitive elements. The mordant according to this invention is a polymer which immobilizes the dye molecule through the formation of a linkage such as a salt linkage, so that the dye molecule can no longer diffuse through the photographic layer. Examples of such polymers include polymeric compounds derived from ethylenically unsaturated compounds containing dialkylaminoalkyl ester residues such as those described in British Pat. No. 685,475 and the copolymers thereof such as those described in U.S. Pat. No. 2,839,401; copolymers of maleic anhydride and derivatives thereof such as those described in British Pat. No. 906,083; polymers obtained by the reaction of polyvinyl alkyl ketones with aminoguanidines such as those described in British Pat. No. 850,281; polymers containing 2-methyl-imidazole nuclei in the side chains thereof such as those described in U.S. Pat. No. 3,445,231; addition polymers between bisacrylamides and secondary diamines or the quaternary salts thereof such as those described in Japanese Patent Application (OPI) No. 24,733/73; ternary or quaternary copolymers containing polyvinyl pyridines or polyvinyl quinolines such as those described in British Pat. Nos. 765,520 and 766,202; and polymers as described in German Patent Applications (OLS) Nos. 1,914,361 and 1,914,362. Preferably, the basic polymer is present in an amount such that about 4 to 20 basic functional groups in the basic polymer are present per mole of the oxonol dye.

The photographic emulsion layers and other hydrophilic colloid layers in the light-sensitive elements of the invention may contain ultraviolet light absorbents, such as those belonging to the benzophenone, benzotriazole and thiazolidine series. These ultraviolet light absorbents may be mordanted in a particular layer in a similar manner as for the oxonol dyes.

The photographic emulsion layers and other hydrophilic colloid layers in the light-sensitive elements of the invention may contain brightening agents, such as stilbenes, triazines, oxazoles, and coumarins. Such a brightening agent may be water-soluble. Water-insoluble brightening agents may also be used in the form of a dispersion thereof.

In addition to the water-soluble dyes according to the invention, the photographic emulsion layers and other hydrophilic colloid layers of the invention may simultaneously contain other known water-soluble dyes as long as they do not substantially impair the effects according to the invention. It is of advantage to use two or more dyes in combination if the desired spectral absorption property can not be attained with a single dye. Examples of useful dyes include oxonol dyes such as those described in Japanese Patent Application (OPI) No. 5,125/74 and U.S. Pat. Nos. 3,247,127, 3,653,905, 2,533,472 and 3,379,533; and hemioxonol dyes such as those described in U.S. Pat. No. 3,687,670 and French Pat. No. 1,421,679. They may also contain alkali-soluble pigments such as manganese dioxide or bleachable pigments such as colloidal silver, in combination with the dyes according to the invention.

The hydrophilic colloid layers in the light-sensitive elements of the invention may also contain compounds used for purposes such as the prevention of color fog and color mixing between layers of color light-sensitive elements. Examples of such compounds include alkylhydroquinones, dialkylhydroquinones, hydroquinones substituted with aryl or sulfo groups, polymeric compounds containing hydroquinone, groups, catechol derivatives, aminophenol derivatives, gallic acid derivatives and ascorbic acid derivatives. If desired, such a compound may be incorporated therein in the form of a dispersion thereof.

Silver halide photographic emulsions used in the light-sensitive elements of the invention may be prepared using any known method, whereby the properties suited for the use and purposes thereof are obtained.

More specifically, suitable silver halide emulsions which can be used in the present invention include those of mixed silver halides such as silver chlorobromide, silver bromoiodide, silver chlorobromoiodide, etc., as well as silver chloride and silver bromide. Silver bromoiodide containing 1 mol% to 12 mol% silver iodide is preferred. The form of the silver halide grains may be any of cubic, octahedral and mixed forms thereof and the grain size need not necessarily be uniform.

The silver halide grains can be formed by conventional processes, such as the single- or double-jet process, the controlled double jet process, etc.

Also, two or more silver halide photographic emulsions which are separately prepared can be used by mixing them. Further, silver halide grains having a uniform structure, silver halide grains wherein the inner and the exterior parts form a different layer structure, and conversion type silver halide grains as described in British Pat. No. 635,841 and U.S. Pat. No. 3,622,318 may be used. Silver halide grains of the type forming a latent image mainly on the surface of the grains and of the type forming a latent image within the grains may be used.

Useful photographic emulsions are also described in C. E. K. Mees & T. H. James, The Theory of the Photographic Process, Macmillan Co., New York (1967), P. Grafkides, Chimie Photographique, Paul Montel, Paris (1957) and like references, and can be prepared according to various conventional processes such as an ammoniacal process, a neutral process, an acidic process, etc.

The above-described silver halide emulsion can be chemically sensitized in a conventional manner, if desired. Suitable chemical sensitizing agents include, for example, gold compounds such as chloroauric acid salt, auric chloride, etc., as described in U.S. Pat. Nos. 2,399,083, 2,540,085 and 2,597,915, salts of noble metals such as platinum, palladium, iridium, rhodium, ruthenium, etc., as described in U.S. Pat. Nos. 2,448,060, 2,540,086, 2,566,245, 2,566,263 and 2,598,079 sulfur compounds capable of reacting with a silver salt to form silver sulfide as described in U.S. Pat. Nos. 1,574,944, 2,410,689, 3,189,458, 3,501,313, etc., stannous salts as described in U.S. Pat. Nos. 2,487,850, 2,518,698, 2,521,925, 2,521,926, 2,694,637, 2,983,610, 3,201,254, etc., amines and other reducing substances.

Photographic emulsions used in the light-sensitive elements of the invention may be spectrally sensitized with sensitizing dyes to blue light of longer wavelengths, green light, red light, or infrared light. Examples of useful sensitizing dyes include cyanine dyes, merocyanine dyes, complex cyanine dyes, complex merocyanine dyes, holopolar cyanine dyes, styryl dyes, hemicyanine dyes, oxonol dyes and hemioxonol dyes. The cyanine dyes can contain basic nuclei such as pyrrolines, oxazolines, thiazolines, pyrroles, oxazoles, thiazoles, selenazoles, imidazoles and pyridines. The merocyanine dyes can contain basic nuclei such as those mentioned above, as well as acidic nuclei such as 2-thiaoxazolidinediones, rhodanines, thiohydantoins, barbituric acids and thiobarbituric acids. The sensitizing dyes may be used either individually or in combination. A number of combinations of sensitizing dyes are known for the purpose of supersensitization.

The photographic emulsion layers or other hydrophilic colloid layers in the light-sensitive elements of the invention may also contain, for the purpose of increasing the sensitivity or the contrast, or promoting development, compounds such as polyalkylene oxides and the ethers, esters and amides thereof; polyalkylene oxide derivatives such as those described in, for example, British Pat. Nos. 1,145,186 and Japanese Patent Publications 10,989/70, 15,188/70, 43,435/71, 8,106/72 and 8,742/72; imidazole derivatives such as those described in Japanese Patent Publication No. 45,541/72; polymers as described in Japanese Patent Publication No. 26,471/70; and 3-pyrazolidones such as those described in Japanese Patent Publication No. 27,670/70.

The photographic emulsion layers in the light-sensitive elements of the invention may also contain color couplers for forming non-diffusible dye images. By color couplers for forming a color image (hereinafter referred to simply as color coupler) is meant compounds that, upon photographic development, undergo a reaction with oxidation products of aromatic primary amine developers to form dyes. The color couplers may be either 4- or 2-equivalent couplers, and may also be colored couplers used for color correction or development inhibitor-releasing couplers. Examples of useful yellow color-forming couplers include open chain ketomethylene compounds such as acylaminoacetamides, or the like. Useful magenta color-forming couplers include pyrazolones and cyanoacetyl compounds. Suitable cyan color-forming couplers include, for example, naphthols or phenols. These color couplers may be introduced into photographic emulsion layers using any methods conventionally used for the production of multi-color light-sensitive elements.

The present invention may also be applied to multilayer multi-color photographic elements having on the support at least two photosensitive layers having different spectral sensitivities. Usually, multilayer natural color photographic elements have at least one red-sensitive silver halide emulsion layer, at least one green-sensitive silver halide emulsion layer and at least one blue-sensitive silver halide emulsion layer. The arrangement of these layers can be changed as desired, depending on the requirements. In general, cyan color-forming couplers are present in the red-sensitive silver halide emulsion layers, magenta color-forming couplers are present in the green-sensitive silver halide emulsion layers, and yellow color-forming couplers are present in the blue-sensitive silver halide emulsion layers. If desired, other combinations may also be employed.

Any of the known processing procedures can be used for the processing of the light-sensitive elements of the invention. Known processing solutions can be used for processing, and the processing steps may be carried out at a temperature below about 18° C. or from about 18 to about 50° C., as well as at a temperature above about 50° C.

The light-sensitive elements of the invention may be subjected to either developing processings for forming silver images (black-and-white photographic processing) or developing processings for forming color images (color photographic processing), depending on their purposes.

Developing solutions used for the black-and-white processing of the light-sensitive elements of the invention may contain known developers. Examples of useful developers include dihydroxybenzenes (e.g., hydroquinone, chlorohydroquinone, etc.), 3-pyrazolidones (e.g., 1-phenyl-3-pyrazolidone, etc.), aminophenols (e.g., N-methyl-p-aminophenol, 2,4-dimethylaminophenol, etc.), pyrogallol, ascorbic acid, 1-aryl-3-pyrazolines (e.g., 1-(p-hydroxyphenyl)-3-amino-pyrazoline, 1-(p-methylaminophenyl)-3-aminopyrazoline, etc.), and the like.

The light-sensitive elements of the invention may be subjected to so-called "lith"-type developing procedures. By "lith"-type developing procedure is meant processing in which development is generally effected infectiously under a reduced sulfite ion concentration by using hydroxybenzenes as a developer, for the purpose of photographic reproduction of halftone images by means of halftone dots. The details of lith-type processing are described in L. F. A. Mason, Photographic Processing Chemistry, pp. 163-165 (1966).

Fixing of the light-sensitive elements of the invention can be carried out by using fixing solutions having conventional compositions. Examples of useful fixing agents include thiosulfates such as sodium thiosulfate, and thiocyanates such as ammonium thiocyanate.

Color developing solutions generally are aqueous alkaline solutions containing color developers. Examples of color developers which can be used for the color development of the elements according to the invention include primary aromatic amine developers such as phenylenediamines (e.g., N,N-diethyl-p-phenylenediamine, N-ethyl-N-(β-hydroxyethyl)amino-2-methylaniline, 4-N-ethyl-N-β-methanesulfonamidoethyl)amino-2-methylaniline, N,N-diethylamino-2-ethoxyaniline, etc.), p-aminophenols (e.g., 4-aminophenol, 2,6-dichloro-4-aminophenol, 2-bromo-4-aminophenol, etc.), and the like.

According to the present invention, filter layers or antihalation layers, as well as other hydrophilic colloid layers dyed for other purposes can retain sufficient absorption densities even when the thickness of such layers is reduced markedly in order to attain good definition. This is because the dyes used in the invention have both good solubility in water and compatibility with gelatin. The light-sensitive elements of the invention, particularly the dyed layers included therein, are capable of being decolorized readily and irreversibly, whereby substantially no color stain remains on the light-sensitive elements after processing.

The photographic properties of the photographic emulsion layers in the light-sensitive elements of the invention are not adversely affected by the incorporation of these dyes into the hydrophilic colloid layers. That is, no desensitization or softening are caused by them in connection with the sensitivity and gradation of the photographic emulsion layers, except for the filtering effect of the dyed layer itself where the dyed layer is situated at a position nearer the light source than the photographic emulsion layers, and no fog is generated by them, irrespective of the photographic properties in the inherently sensitive or spectrally sensitized wavelength region. Moreover, no adverse effect occurs even after a long lapse of time after the production of the elements.

In the light-sensitive elements of the invention, the dyeing is limited only to basic polymer-containing layers and the dyes do not diffuse into other layers. Photographic light-sensitive elements which have excellent photographic properties, particularly spectral properties, can consequently be obtained since an unexpected reduction in sensitivity or gradation due to undesired spectral absorption effects caused by the diffusion of dyes can be prevented. This is of particular advantage for black-and-white and color photographic elements provided with an antihalation layer between a photographic emulsion layer and the support, as well as for color photographic light-sensitive elements having at least three photographic emulsion layers and provided with a filter layer (which may simultaneously serve as an antihalation layer) between two emulsion layers. Because, if a dye diffuses from the layer to be dyed into an emulsion layer situated at a position above (or more remote from the support) than the dyed layer or into a hydrophilic colloid layer situated at a position above the emulsion layer, the emulsion layer is affected by the filtering effect caused by diffused light, so that the sensitivity is reduced and the gradation is softened with respect to light in the wavelength region absorbed by the dye.

In the light-sensitive elements of the invention, which are free from undesirable diffusion of dyes as described above, the reduction in sensitivity of the emulsion layer positioned over the dyed layer can be substantially ignored, i.e., it does not exceed 0.06 with respect to logarithmic exposure.

The present invention will be further illustrated by the following examples.

EXAMPLE 1

Coating solutions were prepared from the following components:

| | |
|---|---|
| Gelatin | 40 g |
| Water | 600 ml |
| Aqueous Solution (5%) of Poly(diethylaminoethyl methacrylate) | 60 ml |
| Aqueous Solution (1%) of Dye* | 100 ml |
| Aqueous Solution (4%) of Hardener** | 200 ml |
| Aqueous Solution (1%) of Phenoxy-polyoxyethylenebutanesulfonic Acid | 40 ml |

*Dye: Dyes 1, 2, 3, 4, 5, 6, 7, 9 and 10 shown herinbefore and Control Dyes A, B, C, D and E shown below were used separately.
**Hardener: Sodium salt of 2,4-dichloro-6-hydroxy-1,3,5-triazine was used.

Comparison Dye A

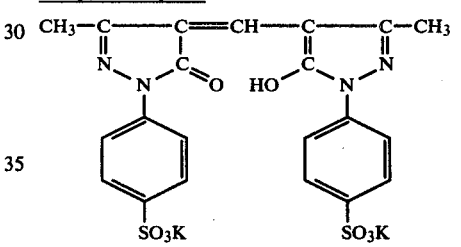

Comparison Dye B

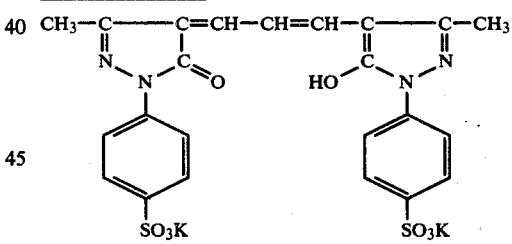

Comparison Dye C

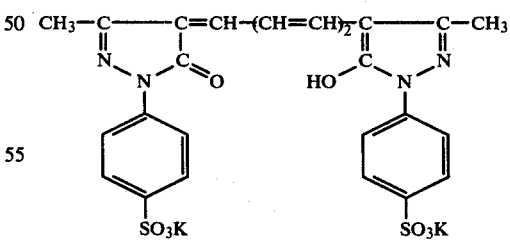

Comparison Dye D

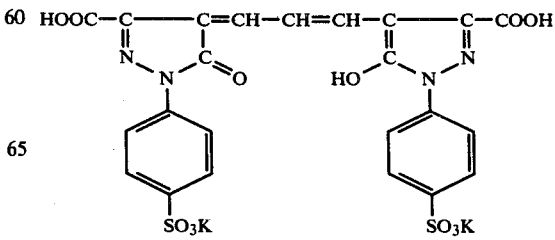

Comparison Dye E

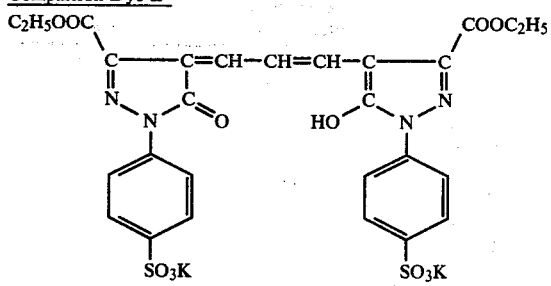

Each solution was coated separately on cellulose acetate films at a thickness of 4μ after drying, and dried. The spectral absorption of each sample was determined.

Onto each of the layers was coated a solution prepared from the following components:

| | |
|---|---|
| Gelatin | 40 g |
| Water | 980 ml |
| Aqueous Solution (1%) of Sodium Dodecylbenzenesulfonate | 50 ml | in a thickness of 8μ after drying, and then dried for about 20 minutes.

The second layer, which was applied without any dye incorporated, was removed by immersing and stirring the samples in warm water for 5 minutes at a temperature of 50° C., and each sample was dried for 10 minutes. The spectral absorption of each sample was determined.

The ratio of dye retained in the first layer was evaluated by P which is defined by the following relationship:

$$P = \frac{a_1}{a_2} \times 100$$

wherein $a_1$ indicates the optical density at the wavelength of the absorption maximum of the sample determined after the application of the first layer, and $a_2$ indicates the same after the removal of the second layer. The results obtained are shown in the following table.

TABLE 1

| Dye Used | P |
|---|---|
| 1 | 98 |
| 2 | 98 |
| 3 | 97 |
| 4 | 96 |
| 5 | 96 |
| 6 | 97 |
| 7 | 96 |
| 9 | 96 |
| 10 | 97 |
| A (comparison) | 60 |
| B (comparison) | 55 |
| C (comparison) | 55 |
| D (comparison) | 50 |
| E (comparison) | 63 |

In the comparison samples containing known dyes, a considerable portion of the dyes diffused into the second layer and were removed together with the layer, so that only a smaller amount of these dyes were able to remain in the first layers, whereas in the samples according to the invention, most (95% or more) of the dyes were retained in the first layers without diffusing into the second layer.

EXAMPLE 2

Onto a subbed cellulose triacetate film were coated, in sequence, a red-sensitive silver iodobromide emulsion which was sensitized to red light with anhydro-5,5'-dichloro-9-ethyl-3,3'-di(3-sulfopropyl)thiacarbocyanine hydroxide and which contained 2,4-dichloro-3-methyl-6-[(2,4-di-tert-amylphenoxy)acetamido]phenol as a cyan color-forming coupler (molar ratio of silver/coupler: 6.0:1) and 6 mol% of silver iodide at a thickness of 5 μm (2 g/m² of silver), a gelatin interlayer at a thickness of 1.5 μm, and a green-sensitive silver iodobromide emulsion which was sensitized to green light with anhydro-9-ethyl-5,5'-diphenyl-3,3'-di(3-sulfopropyl)oxacarbocyanine hydroxide and which contained 1-(2,4,6-trichlorophenyl-3-[3-(2,4-di-tert-amylphenoxy)acetamido]benzamidopyrazoline-5-one as a magenta color-forming coupler (molar ratio of silver/coupler: 10:1) and 6 mol% of silver iodide at a thickness of 4 μm (2 g/m² of silver). On these films were coated yellow filter layers at a thickness of 2 μm using 4 different coating solutions having the compositions described below. (These filter layers had an absorption density of 0.9 at the wavelength of their absorption maxima.) A blue sensitive emulsion containing α-(4-methoxybenzoyl)-2-chloro-5-[α-(2,4-di-tert-amylphenoxy)-butyramido]acetanilide as a yellow color-forming coupler (molar ratio of silver/coupler: 8.0:1) and 6 mol% of silver iodide at a thickness of 5 μm (2 g/m² of silver) and finally a protective surface layer of gelatin was applied thereon at a thickness of 1 μm. The finished samples correspond to color negative light-sensitive elements. The samples were designated 2A, 2B, 2C, and 2D, respectively, corresponding to the yellow filter layer applied thereto.

Coating Solution for Yellow Filter Layer

| | |
|---|---|
| 2A: | |
| Aqueous Solution (10%) of Gelatin | 500 ml |
| Aqueous Solution (5%) of Poly(2-diethylaminoethyl methacrylate) | 220 ml |
| Aqueous Solution (10%) of Dye A shown in Example 1 | 80 ml |
| Aqueous Solution (1%) of Sodium Salt of 2,4-Dichloro-6-hydroxy-1,3,5-triazine | 25 ml |
| Aqueous Solution (2%) of Dodecaethylene Glycol 4-Nonylphenol Ether | 30 ml |

2B:

This coating solution had the same composition as 2A, except that 80 ml of a 10% aqueous solution of Dye 1 described hereinbefore was used instead of the solution of Dye A.

2C:

This coating solution had the same composition as 2A, except that 80 ml of a 10% aqueous solution of Dye 7 described hereinbefore was used instead of the solution of Dye A.

| 2D: | |
|---|---|
| Aqueous Solution (6%) of Gelatin Containing 8 g of Yellow Carey-Lea Colloidal Silver | 500 g |

| | | |
|---|---|---|
| Aqueous Solution (1%) of Sodium Salt of 2,4-Dichloro-6-hydroxy-1,3,5-triazine | 25 ml | |
| Aqueous Solution (2%) of Polyethylene Glycol 4-Nonylphenol Ether | 30 ml | |

Each sample was exposed for 1/200 sec. through a color separation filter Sp-1 manufactured by the Fuji Photo Film Co., Ltd. (transmission maximum ($T_{max}$): about 38%; wavelength at $T_{max}$: about 433 m$\mu$; and wavelength at $T_{max}/2$: about 498 m$\mu$) and a continuous gray wedge, by using a tungsten light source having a color temperature of 5500° K., and then subjected to the following processings:

| | Temperature (°C.) | Time (minutes) |
|---|---|---|
| 1. Color Development | 37.8 | 3½ |
| 2. Washing | " | 1 |
| 3. Bleaching | " | 4½ |
| 4. Washing | " | 1 |
| 5. Fixing | " | 6 |
| 6. Washing | " | 1 |
| 7. Stabilizing | " | 1 |

The processing solutions used had the following compositions:

| | |
|---|---|
| Color Developing Solution | |
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| Tetrasodium Ethylenediaminetetraacetate | 2 g |
| 4-Amino-3-methyl-N-ethyl-N-($\beta$-hydroxyethyl)aniline Sesquisulfate (monohydrate) | 4 g |
| Water to make | 1 l |
| Bleaching Solution | |
| Sodium Salt of Ethylenediaminetetraacetic Acid Iron (III) Complex | 100 g |
| Potassium Bromide | 50 g |
| Ammonium Nitrate | 50 g |
| Boric Acid | 5 g |
| Water to make | 1 l |
| Fixing Solution | |
| Sodium Thiosulfate | 150 g |
| Sodium Sulfite | 15 g |
| Borax | 12 g |
| Glacial Acetic Acid | 15 ml |
| Potassium Alum | 20 g |
| Water to make | 1 l |
| Stabilizing Solution | |
| Boric Acid | 5 g |
| Sodium Citrate | 5 g |
| Sodium Metaborate Tetrahydrate | 3 g |
| Potassium Alum | 15 g |
| Water to make | 1 l |

Photographic characteristic curves were prepared for each of the yellow images of the samples, and their relative sensitivities were determined from the reciprocal of the exposure required to obtain a density of 0.1 above fog. The results obtained are shown in the following table

TABLE 2

| Sample | Relative Sensitivity to Blue Light | Stain |
|---|---|---|
| 2A | 76 | Not Stained |
| 2B | 91 | " |
| 2C | 93 | " |
| 2D | 100 | Stained |

The blue-sensitive emulsion layer in Sample 2A which contains Dye A used for comparison, was considerably desensitized compared with that in Control Sample 2D, because of the filtering effect due to the diffusion of the dye from the yellow filter layer into the blue-sensitive emulsion layer. Each of Samples 2B and 2C according to the invention had a sensitivity almost comparable to that of Control Sample 2D which had a yellow filter layer utilizing colloidal silver and, in addition, was free from stain in contrast to Sample 2D.

EXAMPLE 3

A red-sensitive silver iodobromide emulsion containing a cyan color-forming coupler as in Example 2 was coated on a subbed cellulose triacetate film at a thickness of 5 $\mu$m. The film was then divided into five equal parts, and a magenta filter layer was applied as an interlayer onto each of the film pieces at a thickness of 1.5 $\mu$m by using five different coating solutions having the following compositions. (The magenta filter layers had an absorption density of 0.4 at the wavelength of their absorption maxima.)

Coating Solutions for Magenta Filter Layer

| | |
|---|---|
| 3A: | |
| Aqueous Solution (10%) of Gelatin | 500 ml |
| Aqueous Solution (5%) of Poly (2-diethylaminoethyl methacrylate) | 220 ml |
| Aqueous Solution (10%) of Dye 12 Shown Hereinbefore | 40 ml |
| Aqueous Solution (1%) of Sodium Salt of 2,4-Dichloro-6-hydroxy-1,3,5-triazine | 25 ml |
| Aqueous Solution (2%) of Dodecaethylene Glycol 4-Nonylphenol Ether | 30 ml |

3B:

This coating solution had the same composition as 3A, except that 40 ml of a 10% aqueous solution of Dye 4 was used instead of the solution of Dye 12.

3C:

This coating solution had the same composition as 3A, except that 40 ml of a 10% aqueous solution of Comparison Dye D shown in Example 1 was used instead of the solution of Dye 12.

3D:

This coating solution had the same composition as 3D, except that 40 ml of a 10% aqueous solution of Comparison Dye E shown in Example 1 was used instead of the solution of Dye 12.

| | |
|---|---|
| 3E: | |
| Aqueous Solution (8%) of Gelatin | 500 ml |
| Aqueous Solution (1%) of Sodium Salt of 2,4-Dichloro-6-hydroxy-1,3,5-triazine | 25 ml |
| Aqueous Solution (2%) of Dodecaethylene | 30 ml |

-continued

Glycol 4-Nonylphenol Ether

On each of the samples were coated, in sequence, a green-sensitive silver iodobromide emulsion containing a magenta color-forming coupler as in Example 2 at a thickness of 4 μm, a yellow filter layer having the same composition as 2E in Example 1 at a thickness of 2 μm, a blue-sensitive silver iodobromide emulsion containing a yellow color-forming coupler as in Example 2 at a thickness of 5 μm, and finally a protective surface layer of gelatin at a thickness of 1 μm. The finished samples correspond to color negative light-sensitive elements. The samples were designated as 3A, 3B, 3C, 3D and 3E, corresponding to the magenta filter layers applied thereto.

Each sample was exposed for 1/200 sec. through a color separation filter Sp-2 manufactured by the Fuji Photo Film Co., Ltd. (transmission maximum ($T_{max}$): 63%; wavelength at $T_{max}$: 535 mμ; and wavelength at $T_{max}/2$: 510 mμ) and a continuous gray wedge, using a tungsten light source having a color temperature of 5500° K., and then subjected to the following processings:

|  | Temperature (°C.) | Time (minutes) |
|---|---|---|
| 1. Color Development | 37.8 | 3½ |
| 2. Washing | " | 1 |
| 3. Bleaching | " | 6 |
| 4. Washing | " | 1 |
| 5. Fixing | " | 6 |
| 6. Washing | " | 1 |
| 7. Stabilizing | " | 1 |

The processing solutions used had the following compositions:

| Color Developing Solution | |
|---|---|
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| Tetrasodium Ethylenediaminetetraacetate | 2 g |
| 4-Amino-3-methyl-N-ethyl-N-(β-hydroxyethyl)aniline Sesquisulfate (monohydrate) | 4 g |
| Water to make | 1 l |
| Bleaching Solution | |
| Sodium Salt of Ethylenediaminetetraacetic Acid Iron (III) Complex | 100 g |
| Potassium Bromide | 50 g |
| Ammonium Nitrate | 50 g |
| Boric Acid | 5 g |
| Water to make | 1 l |
| Fixing Solution | |
| Sodium Thiosulfate | 150 g |
| Sodium Sulfite | 15 g |
| Borax | 12 g |
| Glacial Acetic Acid | 15 ml |
| Potassium Alum | 20 g |
| Water to make | 1 l |
| Stabilizing Solution | |
| Boric Acid | 5 g |
| Sodium Citrate | 5 g |
| Sodium Metaborate | 3 g |
| Potassium Alum | 15 g |
| Water to make | 1 l |

The photographic characteristic curves were prepared for each of the magenta images of the samples, and their relative sensitivities were determined from the reciprocal of the exposure required to obtain a density of 0.1 above fog. The results obtained are shown in the following table.

TABLE 3

| Sample | Relative Sensitivity to Green Light | Stain |
|---|---|---|
| 3A | 94 | Not Stained |
| 3B | 91 | " |
| 3C | 73 | " |
| 3D | 68 | " |
| 3E | 100 | " |

The green-sensitive emulsion layers in Samples 3C and 3D which contain Dye C or Dye D used for comparison were considerably desensitized compared with that in Control Sample 3E, because of the filtering effect due to the diffusion of the dyes from the magenta filter layers into the green-sensitive emulsion layers. On the other hand, the green-sensitive emulsion layers in Samples 3A and 3B according to the invention show sensitivities almost comparable to that of Control Sample 3E since the diffusion of dyes into the green-sensitive emulsion layers was negligibly small in the samples according to the invention.

EXAMPLE 4

Onto a subbed cellulose acetate film were coated separately four different coating solutions with the following compositions to serve as antihalation layers, at a thickness of 1 μm.

Coating Solution for Antihalation Layer

| 4A: | |
|---|---|
| Aqueous Solution (10%) of Gelatin | 500 ml |
| Aqueous Solution (5%) of Poly(2-diethyl-Aminoethyl methacrylate) | 220 ml |
| Aqueous Solution (10%) of Dye C shown in Example 1 | 32 ml |
| Aqueous Solution (1%) of Sodium Salt of 2,4-Dichloro-6-hydroxy-1,3,5-triazine | 25 ml |
| Aqueous Solution (2%) of Dodecaethylene Glycol 4-Nonylphenol Ether | 30 ml |

4B:

This coating solution had the same composition as 4A, except that 32 ml of a 10% aqueous solution of Dye 5 shown hereinbefore was used instead of the solution of Dye C.

4C:

This coating solution had the same composition as 4A, except that 32 ml of a 10% aqueous solution of Dye 5 shown hereinbefore was used instead of the solution of Dye C.

| 4: | |
|---|---|
| Aqueous Solution (10%) of Gelatin | 500 ml |
| Aqueous Solution (1%) of Sodium Salt of 2,4-Dichloro-1,3,5-triazine | 25 ml |
| Glycol 4-Nonylphenol Ether | |

Onto these were coated, in sequence, a red-sensitive silver iodobromide emulsion containing a cyan color-forming coupole as in Example 2 at a thickness of 5 μm, a gelatin interlayer at a thickness of 5 μm, a green-sensitive silver iodobromide emulsion containing a magenta color-forming coupler as in Example 2 at a thickness of 4 μm, a yellow filter layer having the same composition as 2E in Example 1 at a thickness of 2 μm, a blue-sensitive silver iodobromide emulsion containing a yellow color-forming coupler as in Example 2 at a thickness of 5 μm, and finally a protective surface layer of gelatin at a thickness of 1 μm. The finished samples correspond to color negative light-sensitive elements. The samples were designated as 4A, 4B, 4C and 4D, corresponding to the antihalation layers applied thereto.

Each sample was exposed for 1/200 sec. through a color separation filter Sp-3 manufactured by the Fuji Photo Film Co., Ltd. (transmission maximum ($T_{max}$): about 92%; wavelength at $T_{max}/2$: about 600 mμ) and a continuous gray wedge, using a tungsten light source having a color temperature of 5500° K., and then subjected to the following processings:

|  | Temperature (°C.) | Time (minutes) |
|---|---|---|
| 1. Color Development | 37.8 | 3½ |
| 2. Washing | " | 1 |
| 3. Bleaching | " | 6 |
| 4. Washing | " | 1 |
| 5. Fixing | " | 6 |
| 6. Washing | " | 1 |
| 7. Stabilizing | " | 1 |

The processing solutions used had the following compositions:

| Color Developing Solution | |
|---|---|
| Sodium Hydroxide | 2 g |
| Sodium Sulfite | 2 g |
| Potassium Bromide | 0.4 g |
| Sodium Chloride | 1 g |
| Borax | 4 g |
| Hydroxylamine Sulfate | 2 g |
| 4-Amino-3-methyl-N-ethyl-N-(β hydroxyethyl)aniline Sesquisulfate (monohydrate) | 2 g |
| Water to make | 1 l |
| Bleaching Solution | |
| Sodium Salt of Ethylenediamine-tetraacetic Acid Iron (III) Complex | 100 g |
| Potassium Bromide | 50 g |
| Ammonium Nitrate | 50 g |
| Boric Acid | 5 g |
| Water to make | 1 l |
| Fixing Solution | |
| Sodium Thiosulfate | 150 g |
| Sodium Sulfite | 15 g |
| Borax | 12 g |
| Glacial Acetic Acid | 15 ml |
| Potassium Alum | 20 g |
| Water to make | 1 l |
| Stabilizing Solution | |
| Boric Acid | 5 g |
| Sodium Citrate | 5 g |
| Sodium Metaborate (tetrahydrate) | 3 g |
| Potassium Alum | 15 g |
| Water to make | 1 l |

Photographic characteristic curves were prepared for each of the cyan images of the samples, and their relative sensitivities were determined from the reciprocal of the exposure required to obtain a density of 0.1 above fog. The results obtained are shown in the following table.

TABLE 4

| Sample | Relative Sensitivity to Red Light | Stain |
|---|---|---|
| 4A | 73 | Not Stained |
| 4B | 93 | " |
| 4C | 95 | " |
| 4D | 100 | " |

The red-sensitive emulsion layer in Sample 4A which contained Dye E used for comparison was considerably desensitized compared with that of Control Sample 4D, because of the filtering effect due to the diffusion of the dye from the antihalation layer into the red-sensitive emulsion layer, whereas Samples 4B and 4C according to the invention show sensitivities almost comparable to that of Control Sample 4D.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive element comprising a silver halide emulsion layer on a support and at least one hydrophilic colloid layer thereon, the element containing the combination of (1) at least one basic polymer and (2) at least one oxonol dye at a coverage of about 8 to about 800 mg/m² represented by the following formula (I):

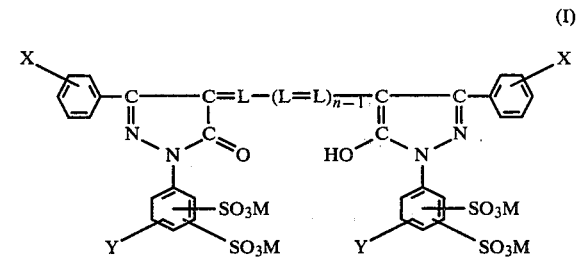

wherein X represents a hydrogen atom, a halogen atom, an alkyl group, an alkoxy group, an alkylthio group, an alkoxycarbonyl group or an amino group; Y represents a hydrogen atom, a halogen atom, a sulfo group, a lower alkyl group or a hydroxy group; L represents a methine group; M represents a cation; and n represents a positive integer of from 1 to 3, wherein said basic polymer is present in an amount such that about 4 to 20 basic functional groups in the basic polymer are present per mole of said dye.

2. The silver halide photographic light-sensitive element of claim 1, wherein said alkyl group for X contains 1 to 6 carbon atoms, said alkoxy group for X contains 1 to 6 carbon atoms, said alkylthio group for X contains 1 to 6 carbon atoms in the alkyl moiety thereof, said alkoxycarbonyl group contains 1 to 6 carbon atoms in the alkoxy moiety thereof and wherein said alkyl group for X may be substituted with one or more of a halogen atom, a cyano group, a sulfo group or a hydroxy group; and said amino group for X may be substituted with an alkyl group containing 1 to 4 carbon atoms or with a carboacyl group.

3. The silver halide photographic light-sensitive element of claim 1, wherein said alkyl group for Y contains 1 to 4 carbon atoms and said methine group represented by L may be substituted with an alkyl group containing 1 to 3 carbon atoms, a phenyl group, a benzyl group, a phenethyl group or a halogen atom.

4. The silver halide photographic light-sensitive element of claim 1, wherein said basic polymer is a water-soluble high molecular weight material containing basic groups in the main chain thereof or in a side chain thereof and which is compatible with gelatin.

5. The silver halide photographic light-sensitive element of claim 1, wherein said basic polymer is a polymer derived from an ethylenically unsaturated compound having a dialkylaminoalkyl ester group, a maleic acid anhydride copolymer or a derivative thereof, a polymer produced by reacting a polyvinylalkylketone with aminoguanidine, a polymer containing a 2-methylimidazole nucleus in a side chain thereof, an addition polymer of bis-acrylamide and a secondary diamine or the quaternary salt thereof, or a copolymer including polyvinylpyridine or polyvinylquinoline.

6. The silver halide photographic light-sensitive element of claim 1, wherein X represents a hydrogen atom.

7. The silver halide photographic light-sensitive element of claim 1, wherein X represents a halogen atom.

8. The silver halide photographic light-sensitive element of claim 1, wherein X represents an alkyl group.

9. The silver halide photographic light-sensitive element of claim 1, wherein X represents an alkoxy group.

10. The silver halide photographic light-sensitive element of claim 1, wherein X represents an amino group.

11. The silver halide photographic light-sensitive element of claim 1, wherein said oxonol dye has the following formula:

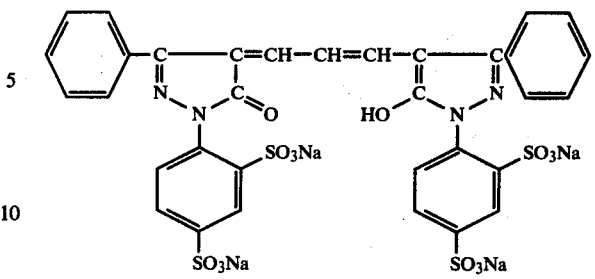

12. The silver halide photographic light-sensitive element of claim 1, wherein in said formula n is 2.

13. The silver halide photographic light-sensitive element of claim 1, wherein in said formula M is Na.

14. The silver halide photographic light-sensitive element of claim 1, wherein said at least one hydrophilic colloid layer is a filter layer, and wherein said basic polymer immobilizes said dye through the formation of a linkage so that the dye molecule can no longer diffuse through the photographic layer.

15. The silver halide photographic light-sensitive element of claim 1, wherein said at least hydrophilic colloid layer is an antihalation layer, and wherein said basic polymer immobilizes said dye through the formation of a linkage so that the dye molecule can no longer diffuse through the photographic layer.

16. The silver halide photographic light-sensitive element of claim 1, wherein said oxonol dye is represented by the following formula:

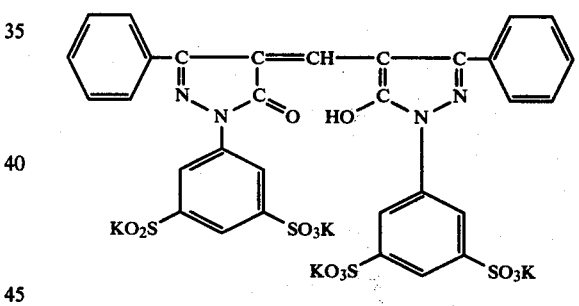

* * * * *